Feb. 25, 1964  G. O. HENINGER  3,122,711
APPARATUS FOR MAINTAINING CONSTANT PHASE
ANGLE OF PARAMETRIC PREAMPLIFIER OUTPUT
Filed April 2, 1962
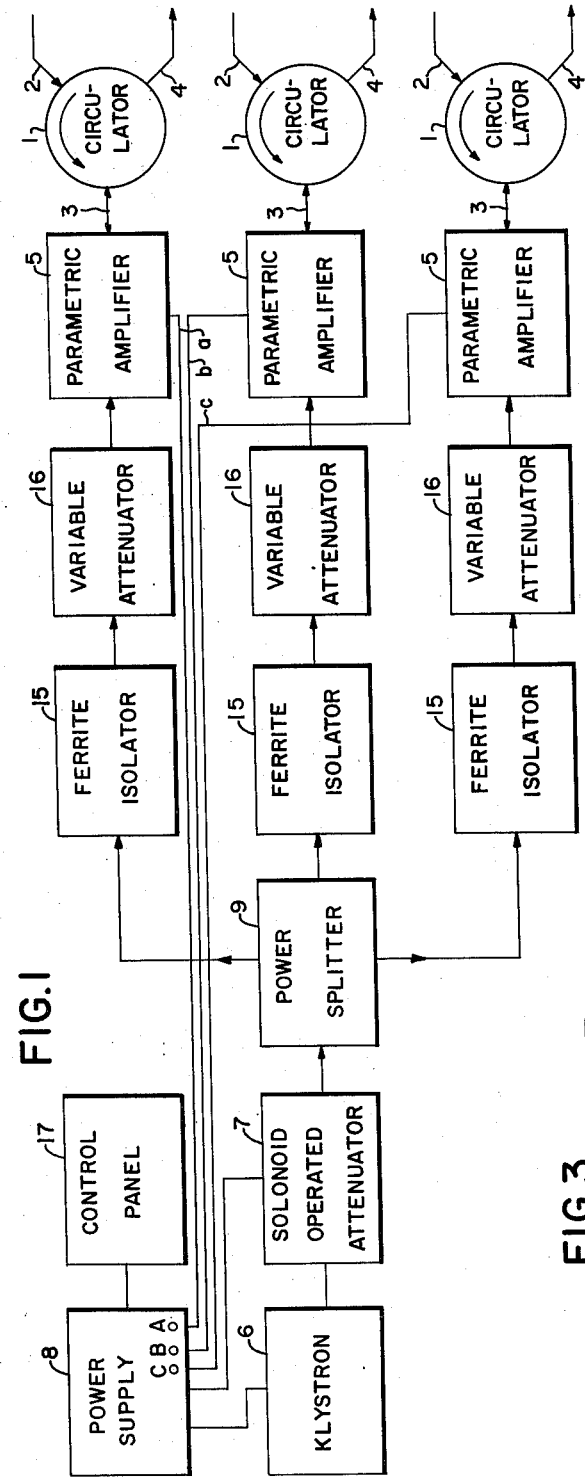
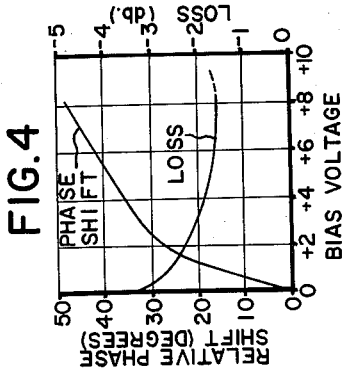
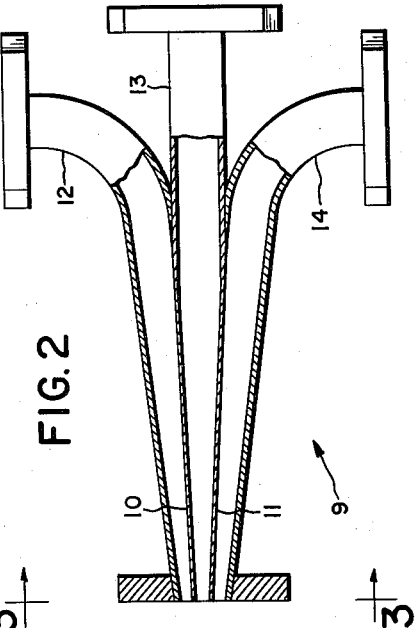
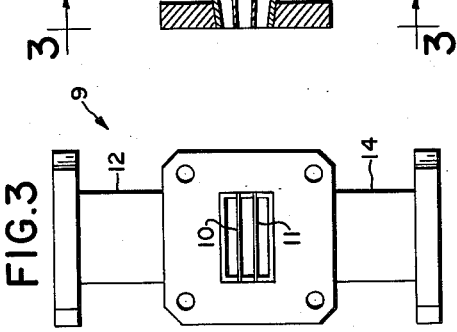
INVENTOR.
GRANT O. HENINGER
BY
ATTORNEY United States Patent Office 3,122,711
Patented Feb. 25, 1964

3,122,711
APPARATUS FOR MAINTAINING CONSTANT PHASE ANGLE OF PARAMETRIC PREAMPLIFIER OUTPUT
Grant O. Heninger, Saratoga, Calif., assignor to Varian Associates, Palo Alto, Calif., a corporation of California
Filed Apr. 2, 1962, Ser. No. 184,287
4 Claims. (Cl. 330—4.9)

The present invention relates generally to parametric amplifier systems, and, in particular, to a system using one or more parametric amplifiers and incorporating a fail-safe feature, the parametric amplifier being useful, for example, as a preamplifier in radar receiver or radio telescope.

An example of a radar receiver for which the present parametric preamplifier is applicable is a multi-channel, four horn monopulse amplitude comparison radar receiver. This receiver, including the parametric preamplifiers, is carefully designed such that signals received by each horn, in the four horn system, maintain the same relative phase angles throughout the receiver and relative gain between the channels is maintained stable. These received microwave signals in each of the four horns are first combined by 3 db short slot hybrid junctions and then separated into three separate microwave channels. The separate microwave signals in the three separate channels are then amplified. The present parametric amplifier system is used as a preamplifier for the separate channels and all of the received radar signals enter into the parametric preamplifier whether it is energized or de-energized by a pump frequency energy.

In the present invention, means must be provided to insure continued operation of the radar receiver in the event of parametric preamplifier failure. As a rule, parametric amplifier failures occur due to pump failure, the pump normally being a klystron. With the parametric preamplifiers energized, the relative phase angles of the received signal must be aligned between channels. Alignment is necessary to compensate for phase shifts due to variance, either capacitive or inductive, in any of the electrical components in each separate channel. If the parametric preamplifiers are not energized, through a failure in the pump source or through positive action taken by the radar operator, means are provided to maintain stable alignment of relative phase relationships between preamplifier channels in order that the radar will remain operative at a lower overall gain.

To maintain stable phase relationships between separate channels, an external bias source is supplied to the varactor of each parametric preamplifier when the preamplifier is in the de-energized position. This external bias provides a means of assuring phase stability when the preamplifier is de-energized.

In order to achieve the required paramp gain stability, a single klystron having very high stability at, for example, 17.750 kilomegacycles at 1 watt minimum power output was chosen as a pump source. By using a single klystron of this frequency, power and stability, all three paramps may be pumped from the same source, thereby assuring relative gain stability between all three channels. In this type of a system, any variation in klystron frequency or power output will affect each paramp simultaneously and minimize relative changes between channels.

A microwave system of the present invention reduces the radar noise figure from 10.5 db to 3.5 db as compared to the same system without the novel parametric preamplifier with a resultant increase in maximum range of approximately 50% which is the equivalent in performance to increasing R.F. power output in the radar by a factor of 5.

The main object of this present invention is to provide a microwave system employing a plurality of parametric amplifiers which can be adapted and integrated into a radio frequency receiver as a preamplifier unit to increase the performance of the receiver.

One feature of the present invention is in the provision of an external bias source for adjusting and maintaining the phase relationship between parametric amplifier channels independent of the parametric pump power to allow operation of the radar unit with the parametric amplifiers de-energized.

Another feature of the present invention is in providing the means to de-energize the parametric amplifier pump power while maintaining the pump in operating condition thereby avoiding a delay in operation of the system while the pump is being warmed to its operating temperature.

Another feature of the present invention is in the use of a waveguide power splitter which receives power from the pump and equally divides the pump power among at least three parametric channels so that the three parametric amplifiers have equal phase and amplitude stability for optimum operating condition.

Another feature of the present invention is the provision in each channel, of means to adjust the pump power level at each parametric amplifier to insure equal phase and amplitude stability.

Another feature of the present invention is in the provision of microwave isolation between parametric amplifiers and the remaining portion of the microwave circuit to prevent reflected energy from the parametric amplifiers from affecting operation of the remaining portion of the circuit.

These and other features of the present invention will become more apparent after a perusal of the following specification and drawings of which:

FIG. 1 is a block diagram of a microwave system in accordance with the present invention, FIG. 2 is a side elevational view partially in cross section, of a power splitter apparatus, FIG. 3 is a view of FIG. 2 taken along the line 3—3 in the direction of the arrows, and FIG. 4 is a graph showing phase shift and loss characteristics in decibels vs. bias voltage for the varactors of each parametric amplifier.

Referring now to the drawings, the microwave system shown in FIG. 1 is connected into the radar antenna network (not shown). The received radar signal is coupled from the antenna network through a coaxial line to the signal input ports of a plurality of circulators 1.

Circulators 1 connected to parametric amplifiers 5 are of the three port C-band type sold and manufactured by the Bendix Corporation of Eatontown, New Jersey. The three ports include input port 2, amplifier port 3 and output port 4. Input port 2 and output port 4 are provided with adapters for coupling the coaxial ports leads of the circulators with waveguides of the radar antenna circuitry while amplifier port 3 is coupled to the coaxial input-output lead of each paramp 5.

The signal is coupled from the circulator 1 via amplifier port 3 into a varactor cavity of each parametric amplifier 5. It is in the varactor cavity (not shown) where the radar signal is amplified in a known manner. The amplified radar signal is reflected back through the amplifier port 3 through the circulator 1, and out via output port 4 into the radar antenna circuitry.

Parametric amplifiers 5 are, for example, of the nondegenerate, reflection, self-biasing type. They are tunable over a frequency range of from 5.42 to 5.85 kilomegacycles and have a 3.5 db maximum noise figure, including the noise figure of their associated circulators 1, and a 17 db nominal gain. The parametric amplifiers used in the present microwave system are commercially available from S-F-D Laboratories, Inc., Union, New Jersey, and sold under the model number S-F-D 902. These parametric amplifiers are not the subject of the present invention and will not be explained in detail but are more fully described, for example, in copending U.S. patent application U.S. Serial No. 94,929, filed March 10, 1961.

Klystron 6 serves as the pump frequency energy source for the three paramp channels and is, for example, a 17.75 kilomegacycle klystron which has 1 watt minimum power output to meet the paramp requirements. A klystron of this type is the VA 513, manufactured and sold by Varian Associates of Palo Alto, California. The output from the klystron 6 is coupled to the three paramps via waveguide sections and microwave circuitry including a solenoid-operated attenuator 7.

Solenoid-operated attenuator 7, for example, a KU 254 manufactured and sold by MCS Corporation of Los Angeles, California, is provided to enable the radar operator to energize or de-energize the paramp during radar operation without adversely affecting radar performance. The attenuator 7 described is a two step attenuator actuated by a remote controlled solenoid (not shown). One position of the solenoid controlled attenuator, the de-energized position, presents less than 0.5 db attenuation to the klystron output and the other position, the energize position, presents over 40 db attenuation to the klystron output. When attenuator 7 is in the 0.5 db position sufficient pump power energy is applied to each of the three paramp channels to give the desired gain. When attenuator 7 is in the 40 db position, negligible klystron power passes the attenuator and the paramp channels are effectively de-energized.

FIG. 4 shows in graphical form the relative phase shift in degrees and the insertion loss in decibels of the received signal vs. bias voltage applied to the varactors. It may be seen from the graph that when the klystron pump power is removed from the paramp channels, the bias voltage caused by the klystron electric field being coupled to the varactor of each paramp will drop to zero. The effect of this will be a near zero phase angle and an increased insertion loss within the paramp. The phase angle and insertion loss of the varactor cavity of the present invention are maintained at a constant operating level by automatically and simultaneously applying an external varactor bias when the solenoid-operated attenuator is in its energize position.

The varactor bias voltage is developed in power supply 8 and fed to the varactor of each paramp 5. This bias voltage, as of, for example, 0.0 to 7.3 v. D.C., is fed to the varactors via three coaxial lines, a, b, and c, and the amount of voltage supplied may be regulated by screw adjustments A, B, and C located, for example, on power supply 8. It is well known in the parametric amplifier art that the self-biased varactor receives most of its bias voltage by energy coupled from the pump signal energy. When the pump energy is stopped, the bias voltage in each paramp varactor decreases to approach zero, depending on the strength of the receiver signal. As each varactor has slightly different physical properties, and the phase angle in each paramp is determined by these properties, changes in the relative phase angles between the radar signal in each paramp channel is probable when the paramps are de-energized, as by failure of the paramp power source. As previously mentioned, the change in relative phase shift would render a multi-channel monopulse amplitude comparison radar inoperative.

The external varactor bias voltages serve to maintain equal relative phase of the reflected radar signals through each paramp channel regardless of the condition of solenoid controller attenuator 7. This relative phase of signals is adjusted at power supply 8 for equal phase shift in each channel with respect to the other channels and this setting preferably remains equal during operation. Equal phase shift is obtained whether the paramps are in the "on" or "off" position as determined by the position of the solenoid-operated attenuator 7.

The provision of an extrenal bias supply permits the paramps to be switched on and off during tracking operation of the radar system without any disruptions from the paramp system. The only change in radar operation caused by energizing the paramps is an 80% reduction of the noise level of the radar. A slight reduction in radar gain due primarily to circulation losses occurs with the paramps de-energized. This reduction in gain is less than 1 db and is relatively insignificant when compared with the noise reduction obtained with the paramps energized. No adjustment is required in any portion of the radar. Therefore, there is no possibility of losing the target being tracked when turning the paramp on or off since the phase delay through the R.F. circuitry is the same for either condition because of the provision of the fail safe external varactor bias obtained from the power supply 8.

The remainder of the microwave circuitry includes a power divider or power splitter 9 coupled to the output of the waveguide section of solenoid-operated attenutaor 7. Power splitter 9 shown in FIGS. 2 and 3 comprises a waveguide input section having three output ports 12, 13 and 14. The input port of power splitter 9 is internally separated by thin wall members or septums 10 and 11 disposed within the power splitter 9 normal to the electric field of the pump supply energy propagated therethrough. Septums 10 and 11 are disposed in such a relation to one another as to divide or split the electric field of the signal entering the power splitter into three portions, as nearly equal to each other as possible, propagating within three parallel directed waveguide sections. The three parallel waveguide sections include portions of length greater than a wavelength tapering to full standard height sections. It is noted that the septums 10 and 11 extend up to the opening of the entrant port of the power splitter 9. This is because it is preferable to prevent the waveguide E-field dimension from being enlarged such that it is larger than the H-field dimension, thereby allowing mode transitions. The split signal is fed through the three output ports 12, 13 and 14 and coupled to three ferrite isolators 15 for passing wave energy to the parametric amplifier 5 without attenuation but heavily attenuating energy traveling in the opposite direction.

Ferrite isolators 15, for example, type KU 1141 manufactured and sold by MCS Corporation of Los Angeles, California, prevent the klystron and the other two paramp channels from receiving reflections which may occur in the remaining portion of the R.F. circuit of each individual paramp channel to the right, in the drawings, of the isolators 15 thereby insuring electrical isolation between paramps. The output from each ferrite isolator 15 is coupled to variable attenuators 16 which are provided to allow adjustment of the pump power level of each paramp.

The variable attenuators 16, for example, type KU 261 manufactured and sold by MCS Corporation of Los Angeles, California, each have a range of from 0–10 db attenuation and are used to adjust the amount of pump energy fed to each paramp to an optimum value for the particular varactor. The output from each variable attenuator 16 is coupled into the pump ports of the three parametric amplifiers 5.

Power supply 8 has a 60 cycle 117 volt A.C. input and develops the necessary output voltages to supply power needs for the klystron 6, to operate the solenoid of attenuator 7, and supply the voltage bias source for the three varactors.

The system described is designed to be installed in existing multi-channel radar units without major modification or relocation of existing R.F. components of the radar system. The present microwave system reduces the radar noise figure from nominal 10.5 db to 3.5 db with a resultant increase in maximum range of approximately 50% which is equivalent in performance to increasing the R.F. power output by a factor of five.

Many alternative arrangements may be used in the present system without departing from the scope of the invention. If it is so desired, a waveguide switch or any other desired means may be used as a substitute for solenoid attenuator 3 to interrupt the pump energy from reaching paramp 5. For example, a waveguide switch being coupled at the energize position to power splitter 6 and at the de-energize position to a dummy load could be used if so desired.

It may be noted that remote control panel 17 may be located at any desired location, for example where the operator of the radar unit is positioned. The only controls on panel 17 are a switch which energizes the solenoid of attenuator 7 and applies bias voltage simultaneously and the power switches for energizing the klystron.

It is further noted that other types of paramps may be used in the present microwave system. For example, any paramp having a gain of approximately 17 db may be used.

A single channel system utilizing a solenoid operated attenuator of the type shown at 7 would utilize the varactor bias voltage to reduce insertion loss associated with removal of the pump power.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A microwave system adaptable for use as a low-noise level pre-amplifier for a received radio frequency signal comprising: a parametric amplifier including a varactor; means electrically communicating with said parametric amplifier for supplying and removing a received radio frequency signal to be amplified; means for developing a high frequency electromagnetic wave energy pump signal; first means for developing a bias voltage across said varactor diode; a microwave circuit including means for coupling said pump signal to said parametric amplifier; second means for producing a varactor bias voltage signal and for applying said second bias voltage to said varactor in the event of a removal of said pump signal from said varactor to maintain a substantially constant phase angle of the received radio frequency signal in said parametric amplifier and to reduce insertion loss of said received radio frequency signal.

2. A microwave system according to claim 1 including a remote control panel electrically connected to said means for producing said second varactor bias voltage for remotely controlling said varactor bias voltage.

3. A microwave system adaptable for use to provide a low-noise level in a received radio frequency signal comprising: a plurality of parametric amplifiers each including a varactor; each of said parametric amplifiers further including means electrically communicating therewith for supplying and removing a received radio frequency signal to be amplified; a high frequency electromagnetic wave energy source for providing pump signal energy; microwave circuit means for coupling pump signal energy to each of said parametric amplifiers; first means for developing a bias voltage across said varactor derived from said pump signal energy; a power supply means for producing a second varactor bias voltage source, means for electrically coupling said second bias voltage source to the varactor of each of said parametric amplifiers in the event of a removal of said pump signal energy to maintain a constant phase angle of the received radio frequency signal in each parametric amplifier with respect to the phase angle in each other parametric amplifier when the pump energy is removed therefrom.

4. A microwave system adaptable for use as a low-noise level pre-amplifier for a received radio frequency comprising: a parametric amplifier including a varactor; means electrically communicating with said parametric amplifier for supplying and removing a received radio frequency signal to be amplified; means for developing a high frequency electromagnetic wave energy pump signal; a microwave circuit including means for energizing and de-energizing said parametric amplifier with said pump signal; means forming a self bias circuit for developing from the pump energy applied to said parametric amplifier a first varactor bias voltage across said varactor diode; control means operably connected to said means for energizing and de-energizing said amplifier to control the supply of pump signal to said parametric amplifier; means for producing a second varactor bias voltage signal, means for electrically coupling said second bias voltage to the varactor of said parametric amplifier; said control means being further operably connected to said second varactor bias supply for simultaneously de-energizing said pump signal as applied to said parametric amplifier and applying said second bias voltage to said varactor to maintain constant phase angle of the received radio frequency signal in said parametric amplifier and to reduce insertion loss of said received radio frequency energy.

References Cited in the file of this patent

FOREIGN PATENTS 1,111,313    France _____ Oct. 26, 1955

OTHER REFERENCES

Grabowski et al.: "Proceedings of the IRE," December 1960, pages 1973–1987 (page 177 relied on).

Knechtli et al.: "Proceedings of the IRE," July 1960, pages 1218–1226.

"Microwave Transmission Circuits," edited by Ragan, Radiation Laboratory Series No. 9, McGraw-Hill, New York, 1948, pages 522–525.